United States Patent [19]
Collins

[11] 3,816,975
[45] June 18, 1974

[54] PURIFICATION OF HYDROCARBON FEEDSTOCKS
[75] Inventor: John Joseph Collins, Katonah, N.Y.
[73] Assignee: Union Carbide Corporation, New York, N.Y.
[22] Filed: Nov. 14, 1972
[21] Appl. No.: 306,293

[52] U.S. Cl.............................. 55/33, 55/62, 55/75
[51] Int. Cl............................................. B01d 53/04
[58] Field of Search............ 55/33, 62, 73, 75, 389; 208/188; 260/677 AD

[56] References Cited
UNITED STATES PATENTS

| | | | |
|---|---|---|---|
| 3,130,821 | 4/1964 | Milton | 55/33 |
| 3,566,611 | 3/1971 | Strerrett | 55/75 |
| 3,725,299 | 4/1973 | Turnock | 55/75 |
| 3,880,433 | 3/1963 | Hengstebeck | 208/188 |

Primary Examiner—Charles N. Hart
Attorney, Agent, or Firm—Richard G. Miller

[57] ABSTRACT

Olefin - containing paraffin feedstocks are dehydrated and desulfurized by a selective adsorption process in the liquid phase using large pore zeolitic molecular sieves. Coking of the adsorbent is prevented by avoiding contact of the olefin with a sorbate — free adsorbent and desorbing olefin from the adsorbent by displacement with water.

1 Claim, 1 Drawing Figure

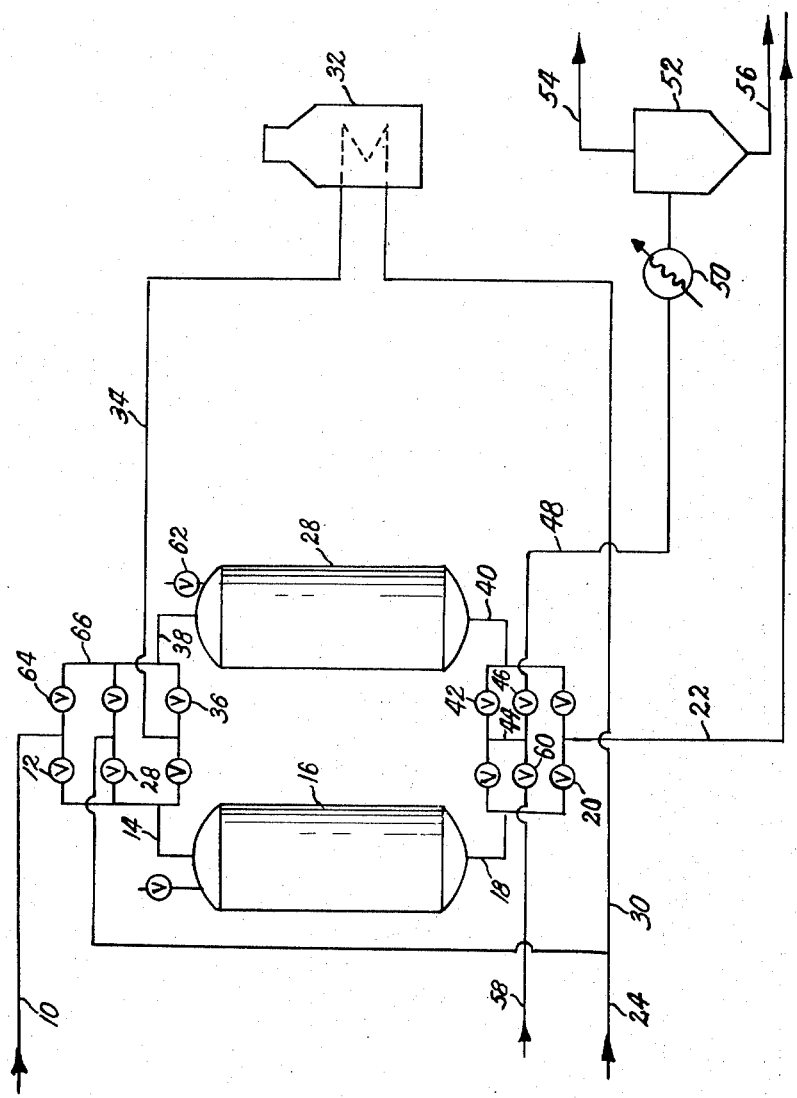

PURIFICATION OF HYDROCARBON FEEDSTOCKS

The present invention relates in general to the purification of hydrocarbon feedstocks and more particularly to a process for the removal of water and sulfur compound impurities from olefin — containing feedstocks such as those employed in catalytic isoparaffin alkylation processes.

Propylene and butylene are produced mainly as a by-product in the catalytic or thermal cracking of crude oil. Essentially all of the butylene and the major fraction of the propylene are subsequently alkylated with iso-butane to make motor gasoline. Amylenes, which are obtained by depentanizing or cracked gasoline are often present in the olefin feed to the alkylation unit and alkylated with isobutane. Typically, the fresh olefin feed to an alkylation unit contains 40–70 percent C3-C5 olefins of which 40–80 percent is butylene while the balance is primarily propylene.

The alkylation reaction is carried out liquid phase in the presence of a concentrated HF or $H_2SO_4$ acid catalyst. The presence of contaminants such as sulfur compounds, water, and butadiene in the feed lead to a high acid catalyst consumption rate, lower octane alkylate and excessive equipment corrosion. The sulfur compounds present are typically but not exclusively hydrogen sulfide and low molecular weight mercaptans which were present as such in the plant crude oil and/or produced by decomposition of higher molecular weight sulfur compounds during subsequent processing, e.g., catalytic cracking.

Propylene is also used as a feedstock in the manufacture of iso-propanol, acrylonitrite, propylene oxide, and polypropylene, and used with propane as a fuel. As such the propylene must meet "chemical grade" or "polymer grade" purity specifications and meet a corrosive sulfur specification, respectively.

Heretofore it has been conventional to remove sulfur compound contaminants from olefin — containing process streams including alkylation feed and propylene by cumbersome chemical methods such as scrubbing with diethylamine to remove hydrogen sulfide followed by a caustic-water wash to remove mercaptans and finally by a dryer to remove water. Although zeolitic molecular sieve adsorbents have, before now, been utilized to purify a wide variety of hydrocarbon process streams, it is known that olefins coadsorbed with the impurity materials cause the formation of undesirable coke deposits on the zeolite particles when the adsorbent bed is heated and purged to desorb the accumulated sulfur compounds.

It is accordingly the general object of the present invention to provide a process for purifying olefin — containing feedstocks by selective adsorption of the impurities on zeolitic molecular sieve adsorbents which eliminates or greatly diminishes the formation of olefin derived carbonaceous coke deposits on the absorbent during the various steps of the process.

This general object and others which will be obvious from the specification are accomplished by a process which comprises the steps of (a) providing a feedstock comprising a mixture of a monoolefin and a paraffin each having from 3 to 4 inclusive carbon atoms, at least 50 ppm (wt) and not more than 1,000 ppm (wt) water and at least one sulfur compound impurity selected from the group consisting of $H_2S$ and RSH wherein R is an alkyl radical containing from 1 to 4 carbon atoms; (b) providing a fixed adsorption bed containing zeolitic molecular sieve adsorbent having an apparent pore diameter of greater than 5 Angstroms, said adsorption bed being at a temperature below 300° F and said molecular sieve adsorbent having adsorbed thereon a sufficient quantity of a paraffinic hydrocarbon having from 3 to 4 carbon atoms inclusive such that the temperature rise of the olefin mass transfer zone during the subsequent step (c) does not exceed 100° F; (c) as an adsorption — purification stroke passing said feedstock in the liquid phase and at a temperature below 200° F through said fixed adsorption bed whereby water and the sulfur compound impurity is adsorbed and a purified mixture of monoolefin and paraffin are recovered from the bottom end of the bed, said adsorption — purification stroke being terminated prior to breakthrough of sulfur compound impurity; (d) downwardly draining the interstitially held liquid from the adsorption bed, preferably in a manner which does not appreciably cool the bed; (e) cocurrently purging the bed with from 2 to 20 pound moles of a non-sorbable purge gas per 100 pounds of adsorbent in the bed, said purging being carried out at a temperature of from 0° F to 300° F, preferably from 32° F to 250° F, said non-sorbable purge gas containing not more than 250 ppm (vol.) water and being substantially free of aliphatically unsaturated hydrocarbons; (f) cocurrently purging the bed with a non-sorbable purge gas at a temperature of from 450° F to 650° F, said purging being terminated not earlier than when the difference between the temperature of the effluent end of the bed and the influent end of the bed is less than 100° F, preferably less than 50° F; and (g) restoring the bed to the beginning of step (c) by passing thereinto a sufficient quantity of a paraffinic hydrocarbon having from 3 to 4 carbon atoms inclusive.

The feedstock being treated in accordance with this invention suitably is composed of any porportion of monoolefin and paraffin, each containing from 3 to 4 carbon atoms, but preferably is comprised of a major porportion of paraffin with respect to the monoolefin constituent. The paraffins include isobutane as well as propane and n-butane. The monoolefins include butene-1, butene-2, isobutene and propylene. Minor proportions of both paraffinic and olefinic molecules of various numbers of carbon atoms such as can result from distillation procedures to obtain the $C_3$ to $C_4$ hydrocarbons are not harmful to the process and can be present. The proportion of isoparaffin to monoolefin is advantageously from 5:1 to 50:1, preferably about 30:1, on a molar basis. Such proportions are typical of isoparaffin alkylation process feedstocks.

The sulfur compound impurities can constitute a total of from 1 to 5,000 ppm (wt) calculated as elemental sulfur of the feedstock. In the case of feedstocks, such as isoparaffin alkylation feedstocks, which have been formed from various distillation fractions, little or no $H_2S$ will be present and the principal sulfur compound impurities will be the alklmercaptans whose boiling points approximate the paraffin constuents of the feedstock. It will be understood that certain of the sulfur compound molecules in the feedstock can undergo chemical reactions or transformations in contact with the zeolite in the adsorption bed. Accordingly even if $H_2S$ is not a constituent of the feedstock, it can be produced in the bed by decomposition of a mercaptan.

A typical feedstock suitably treated by the present process comprises:

| | |
|---|---|
| Propylene | 20.7 (liq. vol. %) |
| Propane | 16.7 (liq. vol. %) |
| Iso-Butane | 27.2 (liq. vol. %) |
| n-Butane | 12.0 (liq. vol. %) |
| Butenes | 18.3 (liq. vol. %) |
| i-Pentane | 3.4 (liq. vol. %) |
| n-Pentane | 0.1 (liq. vol. %) |
| Pentenes | 0.4 (liq. vol. %) |
| Hexanes | 0.3 (liq. vol. %) |
| Water | 500 ppm (wt) |
| Methyl mercaptan | 12 ppm (v) |
| Ethyl mercaptan | 4 ppm (v) |

The adsorbent materials employed in the present process are the natural or synthetically prepared crystalline zeolitic aluminosilicates commonly referred to as molecular sieves. Although molecular sieves having pores with an apparent maximum dimension of 4.6A can readily adsorb sulfur compound molecules such as $H_2S$ and normal alkyl mercaptans, it is found that molecular sieves having an apparent pore size at least as large as 6 Angstroms are essential to the practice of the present process.

The term apparent pore size as used herein may be defined as the maximum critical dimension of the molecular seive in question under normal conditions. The apparent pore size will always be larger than the effective pore diameter, which may be defined as the free diameter of the appropriate silicate ring in the zeolite structure.

Among the naturally occurring zeolitic molecular seives suitable for use in the present invention is faujasite having a pore size of about 10 Angstroms. The natural materials are adequately described in the chemical literature. The preferred synthetic crystalline zeolitic molecular seives include zeolites zeolites X, Y, L and Ω. Zeolite L has an apparent pore size of about 10 Angstroms, and is described and claimed in U.S. Pat. No. 3,216,789. Zeolite X has an apparent pore size of about 10 Angstroms, and is described and claimed in U.S. Pat. No. 2,882,244, having issued Apr. 14, 1959 to R.M. Milton. Zeolite Y has apparent pore size of about 10 Angstroms, and is described and claimed in U.S. Pat. No. 3,130,007. Zeolite Ω is descirbed in pending U.S. application Ser. No. 655,318, filed July 24, 1967. Zeolite L is described in U.S. Pat. No. 3,216,789.

The pore size of the zeolitic molecular seives may be varied by employing different metal cation. For example, sodium zeolite A (U.S. Pat. No. 2,882,243) has an apparent pore size of about 4 Angstrom units, whereas calcium zeolite A has an apparent size of about 5 Angstrom units.

The zeolites occur as agglomerates of fine crystals or are synthesized as fine powders and are preferably tableted or pelletized for large scale adsorption users. Pelletizing methods are known which are very satisfactory because the sorptive character of the zeolite, both with regard to selectivity and capacity, remains essentially unchanged. Many suitable inert binder materials or compositions are well known in the art including clays, refractory metal oxides and alkali metal silicates, if it is desired to utilize the adsorbents in agglomerated form. In general, the individual molecular seive crystals are quite small (of the order of 10 microns) and hence in fixed bed operation, at least, it is advantageous to agglomerate the crystals into beads, pellets, extrudate forms, etc., either with or without added binder material.

The "non-sorbable" purge gas employed in either step (e) and step (f) or both of the process as generally described hereinbefore, is any of the group of elements or compounds conventionally used to aid in desorbing molecular seive bed and which by virtue of their inertness towards the adsorbent and adsorbate, their low polarity and high volatility are only very slightly adsorbed by molecular sieves at ambient room temperatures and moderate pressures. Hydrogen, nitrogen and helium and the other inert gases can be suitably employed but it is greatly preferred to use as the purge gas, pipeline quality natural gas. The purge gas advantageously has a maximum water content of 7 pounds per million standard cubic feet, a maximum olefin content of 100 ppm (v), and a maximum sulfur content of 0.25 grain (as elemental sulfur). In addition the purge gas should be free from any other strongly adsorbed or reactive constituents such as compressor oil or gas treating chemicals such as glycols and amines which are common in some pipeline natural gas.

Each of the consecutive steps of the present process is integrated with the others to provide a high degree of dehydration and desulfurization of the feedstock without encountering serious bed deactivation due to olefin coking. The adsorption stroke is begun with a loading of $C_3$ or $C_4$ paraffin on the zeolite so that the heat of adsorption of monoolefin from the feedstock is somewhat balanced by the heat of desorption of the paraffin. This prevents local heating of the olefin to temperatures favoring polymerization or decomposition. The function of the relatively cool cocurrent purge with a non-sorbable gas at the initiation of bed regeneration is not precisely known but is found to be essential. One reasonable theory is that it is necessary to prevent the formation of an un-acceptably high level of decomposition products from materials remaining adsorbed and sponged onto the bed following the drain step.

The hot purge step is carried out in the same direction as the warm purge, and generally the same gas stream is used for both steps. This step is intended to strip the bed of adsorbed impurities to the low levels required to maintain efficient adsorption on a cyclic basis. As such, both the warm and hot purge steps should be carried out using a gas stream which is substantially dry, sweet and olefin-free and at a moderate pressure. A very important function of the hot purge step is to desorb water from the ingress end of the bed and move it in a well defined zone downward through the bed where it acts to desorb olefins and sulfur compounds by displacement under relatively moderate thermal conditions. The hot purge step typically requires a quantity of gas corresponding to (15) moles for each (100) pounds of adsorbent to be regenerated. This requirement will vary, depending upon the available temperature and pressure of the regeneration gas stream, and will also be affected by the heat losses associated with the mechanical hardware.

The repressurization, cooling and filling of the bed following regeneration, can generally be accomplished satisfactorily with a fresh isobutane stream. Upflow is the preferred direction for the step, if the isobutane is bone dry and sweet, to avoid the possibility of the formation of gas pockets, which can lead to problems of flow channeling when returning to adsorption. Downflow is feasible and often necessary when the isobutane is wet. In this case an outlet is needed at the top of the vessel to vent the natural gas displaced from the bed voids. In addition to repressuring, cooling, and filling the bed, this step also accomplishes the very important function of pre-loading of the adsorbent for the next adsorption stroke.

The present process is illustrated by the description hereinafter taken in conjunction with the drawing which is a flow diagram of a typical two-bed adsorption system for carrying out the process.

With specific reference to the drawing, a feedstock containing 50 vol.-percent isobutane, approximately 50 vol.-percent butenes, 800 ppm ethylmercaptan as sulfur by wt. and 200 ppm by wt $H_2O$ is fed through line 10, valve 12 and line 14 to the top of adsorption bed 16 which contains as the adsorbent sodium zeolite X having a pore size of about 10 Angstroms. The adsorbent bed contains an equilibrium loading of iosbutane based on the weight of zeolite adsorbent. As the feedstock passes through the bed, water and ethylmercaptan are selectively adsorbed and isobutane and butene are removed as product from the bed through line 18, valve 20 and line 22. The adsorption stroke is discontinued at a time such that no breakthrough of sulfur compound has occurred and there is a sufficient portion of unused bed that no breakthrough of sulfur compound occurs during the subsequent step of draining the interstitially held liquid. Upon termination of the adsorption of the adsorption stroke, valve 12 is closed and the interstitially held liquid in the bed is drained through line 18, valve 20 and line 22. Due to decreasing pressure in the drained upper portion of bed 16 during the removal of the interstitially held liquid, undue cooling can occur as a result of evaporation of the said liquid. To inhibit this cooling and to assist in draining the bed, purge gas (methane) at a pressure 10 to 20 psia greater than that used during the adsorption stroke can be fed from line 24, valve 26 and line 14 is fed into the top of bed 16 to maintain a positive pressure in bed 16 during the draining step.

At the beginning of the adsorption stroke in bed 16, bed 28 has undergone the draining of the interstitially held liquid after adsorption as in bed 16 and contains a water adsorption zone approximately 1/10 of the bed length measured from the upper end of the bed. Lower in the bed are sulfur compound impurities and coadsorbed therewith are olefins. Also present is a sponged liquid mixture of isoparaffin and monoolefin. To carry out regeneration of drained bed 28 pure pipeline natural gas is passed through line 24 and line 30, and is heated to 250° F in heater 32 and is passed through line 34 and valve 36 line 38 into the top of bed 28. This purging step with warm natural gas rids the bed 28 of capillary pore condensed liquid and at least some of the adsorbed olefins and mercaptans. These exit from the bed through line 40, valve 42, line 44, valve 46 and line 48 to cooler 50 and thence to separator 52. From line 54 sulfur compound impurities, and natural gas re removed from the system for further processing in any desired manner. The bottoms from separator 52 are conducted out of the system through line 56. During the warm purge the water adsorption zone in the upper part of bed 28 stays essentially in tact. After 5 pound moles of warm purge gas per 100 pounds of adsorbent have been passed through bed 28, the temperature of the furnace 32 is increased to raise the temperature of the purge gas to 550° F and gas flow through bed 28 is continued in the same manner until the lower end of bed 28 is within 50° F of the ingress or upper end of the bed. This purge moves the water adsorption zone through the bed and acts as a water pulse to desorb all sulfur compounds and adsorbed olefins. These materials are less strongly adsorbed than water and leave the bed ahead of the water zone. Into the thus regenerated bed 28, liquid isobutane at a temperature of 85° F is fed through line 58, valve 60, line 44, valve 42 and line 40. The bed is filled with the liquid isobutane. Purge gas in the bed at the beginning of the isobutane filling step is vented from the system through valve 62. Thereafter a new adsorption stroke is began in bed 28 by directing feedstock from line 10 through valve 64 and lines 66 and 38 into the top of the bed. At this point regeneration of bed 16 is began in a manner just described with regard to bed 28.

What is claimed is:

1. Purification process which comprises the steps of (a) providing a feedstock comprising of a monoolefin and a paraffin each having from 3 to 4 carbon atoms inclusive, at least 50 ppm (wt) and not more than 1,000 ppm (wt) water and at least one sulfur compound impurity selected from the group consisting of $H_2S$ and RSH wherein R is an alkyl radical containing from 1 to 4 crabon atoms; (b) providing a fixed adorption bed containing zeolitic molecular sieve adsorbent having an apparent pore diameter of greater than 6 Angstroms, said adsorption bed being at a temperature below 300° F and said molecular sieves adsorbent having adsorbed thereon a sufficient quantity of a paraffinic hydrocarbon having from 3 to 4 carbon atoms inclusive such that the temperature rise of the olefin mass transfer zone during the subsequent step (c) does not exceed 100° F; (c) as an adsorption — purification stroke passing said feedstock in the liquid phase and at a temperature below 200° F through said fixed adsorption bed whereby water and the sulfur compound impurity are adsorbed and a purified mixture of monoolefin and paraffin are recovered from the bottom end of the bed, said adsorption — purification stroke being terminated prior to breakthrough of sulfur compound impurity; (d) downwardly draining the interstitially held liquid from the adsorption bed; (e) cocurrently purging the bed with from 2 to 20 pounds of a non-sorbable purge gas per 100 pounds of adsorbent in the bed, said purging being carried out at a temperature of from 0° F to 300° F, preferably from 32° F to 250° F, said non-sorbable purge gas containing not more than 250 ppm (vol) water and being substantially free of aliphatically unsaturated hydrocarbons; (f) cocurrently purging the bed with a non-sorbable purge gas at a temperature of from 450° F to 650° F, said purging being terminated not earlier than when the difference between the temperature of the effluent end of the bed and the influent end of the bed is less than 100° F, preferably less than 50° F; and (g) restoring the bed to the condition existing just prior to the beginning of step (c) by passing thereinto a sufficient quantity of a paraffinic hydrocarbon having from 3 to 4 carbon atoms inclusive.

* * * * *